(12) United States Patent
Cadden et al.

(10) Patent No.: US 10,830,354 B2
(45) Date of Patent: Nov. 10, 2020

(54) PROTECTION SYSTEM WITH GASKET FOR CERAMIC CORE PROCESSING OPERATION AND RELATED METHOD

(71) Applicant: GENERAL ELECTRIC COMPANY, Schenectady, NY (US)

(72) Inventors: Timothy Austin Cadden, Greenwood, SC (US); Richert Arthur Davis, Aiken, SC (US); Jeffrey Clarence Jones, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 15/983,604

(22) Filed: May 18, 2018

(65) Prior Publication Data

US 2019/0353248 A1    Nov. 21, 2019

(51) Int. Cl.
*F16J 15/02*       (2006.01)
*B22C 9/10*        (2006.01)
*F16J 15/10*       (2006.01)
*F16J 15/06*       (2006.01)

(52) U.S. Cl.
CPC .............. *F16J 15/022* (2013.01); *B22C 9/108* (2013.01); *F16J 15/061* (2013.01); *F16J 15/104* (2013.01)

(58) Field of Classification Search
CPC .......... F16J 15/022; F16J 15/104; F16J 15/02; B22C 9/108
See application file for complete search history.

(56) References Cited

U.S. PATENT DOCUMENTS

| 4,522,413 | A | * | 6/1985 | Nicholas | E01C 11/106 |
| | | | | | 277/645 |
| 5,042,821 | A | * | 8/1991 | Bontly | F16J 15/022 |
| | | | | | 235/462.32 |
| 5,296,308 | A | * | 3/1994 | Caccavale | B22C 9/04 |
| | | | | | 164/361 |
| 6,435,256 | B1 | | 8/2002 | Anderson et al. | |
| 7,686,581 | B2 | | 3/2010 | Brittingham et al. | |
| 7,887,063 | B2 | * | 2/2011 | Rueger | F16J 15/127 |
| | | | | | 277/594 |

(Continued)

FOREIGN PATENT DOCUMENTS

| JP | 62221435 A | * | 9/1987 | ................. B01J 3/03 |
| JP | 10148261 A | * | 6/1998 | ............. F16J 15/022 |
| JP | 2017101769 A | * | 6/2017 | ............. F16J 15/061 |

*Primary Examiner* — Eugene G Byrd
(74) *Attorney, Agent, or Firm* — James Pemrick; Hoffman Warnick LLC

(57) ABSTRACT

A protection system for preventing foreign material from lodging in a channel between and/or damage to adjacent ceramic core features during a core processing operation is disclosed. The system includes a gasket sized and shaped to self-lock within the channel and prevent foreign material from lodging within the channel during the core processing operation. A method may include determining a geometrical characteristic of the channel and adjacent ceramic core feature; fabricating a gasket to fit and self-lock within the channel; positioning the gasket within the channel; and performing the core processing operation. The gasket prevents the foreign material from lodging in the channel, reducing subsequent damage to the ceramic core compared to the channel without the gasket.

18 Claims, 11 Drawing Sheets

(56) References Cited

U.S. PATENT DOCUMENTS

| | | | | |
|---|---|---|---|---|
| 9,017,025 B2* | 4/2015 | Lee | ............... | F01D 5/187 |
| | | | | 416/97 R |
| 2005/0077683 A1* | 4/2005 | Comert | ............... | B60R 13/06 |
| | | | | 277/300 |
| 2013/0264773 A1* | 10/2013 | McDowell | ............... | F16J 15/10 |
| | | | | 277/312 |
| 2014/0138385 A1* | 5/2014 | Wolf | ............... | B60K 15/0406 |
| | | | | 220/378 |
| 2014/0374994 A1* | 12/2014 | Monteil | ............... | F16L 17/035 |
| | | | | 277/314 |
| 2016/0131258 A1* | 5/2016 | Cook | ............... | F16J 15/104 |
| | | | | 277/600 |
| 2016/0169388 A1* | 6/2016 | Halla | ............... | F16J 15/062 |
| | | | | 277/641 |
| 2017/0074401 A1* | 3/2017 | Saxton | ............... | F16J 15/104 |
| 2017/0173672 A1 | 6/2017 | Foster et al. | | |
| 2017/0343117 A1* | 11/2017 | Fumanal | ............... | F16J 15/025 |
| 2018/0149029 A1* | 5/2018 | Vetters | ............... | F01D 11/003 |

\* cited by examiner

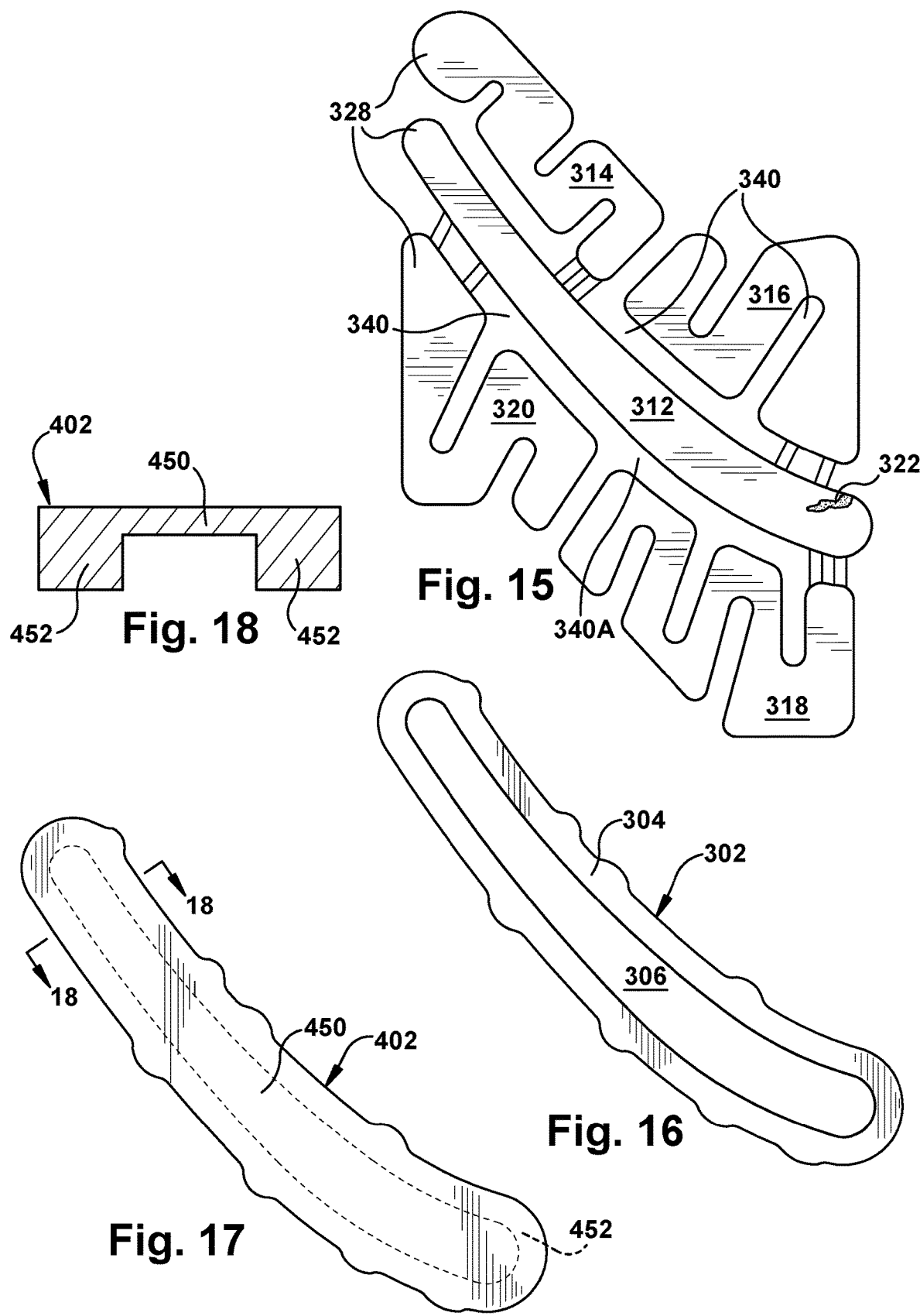

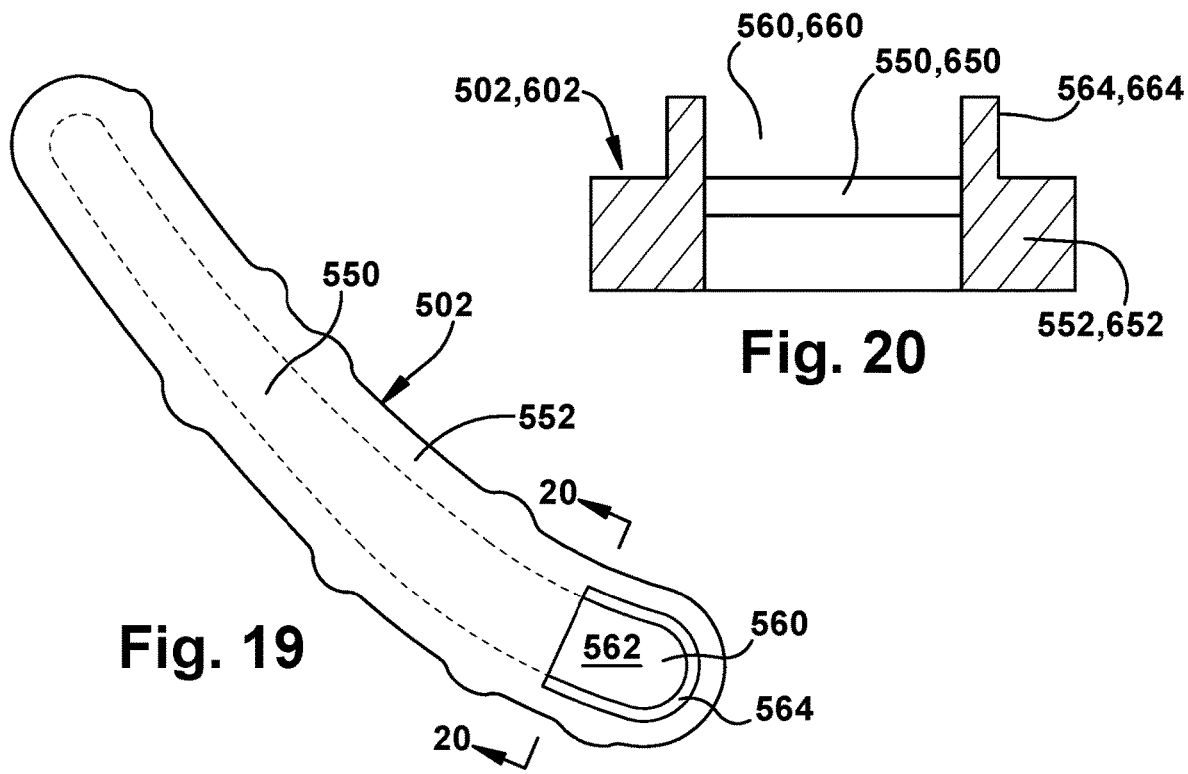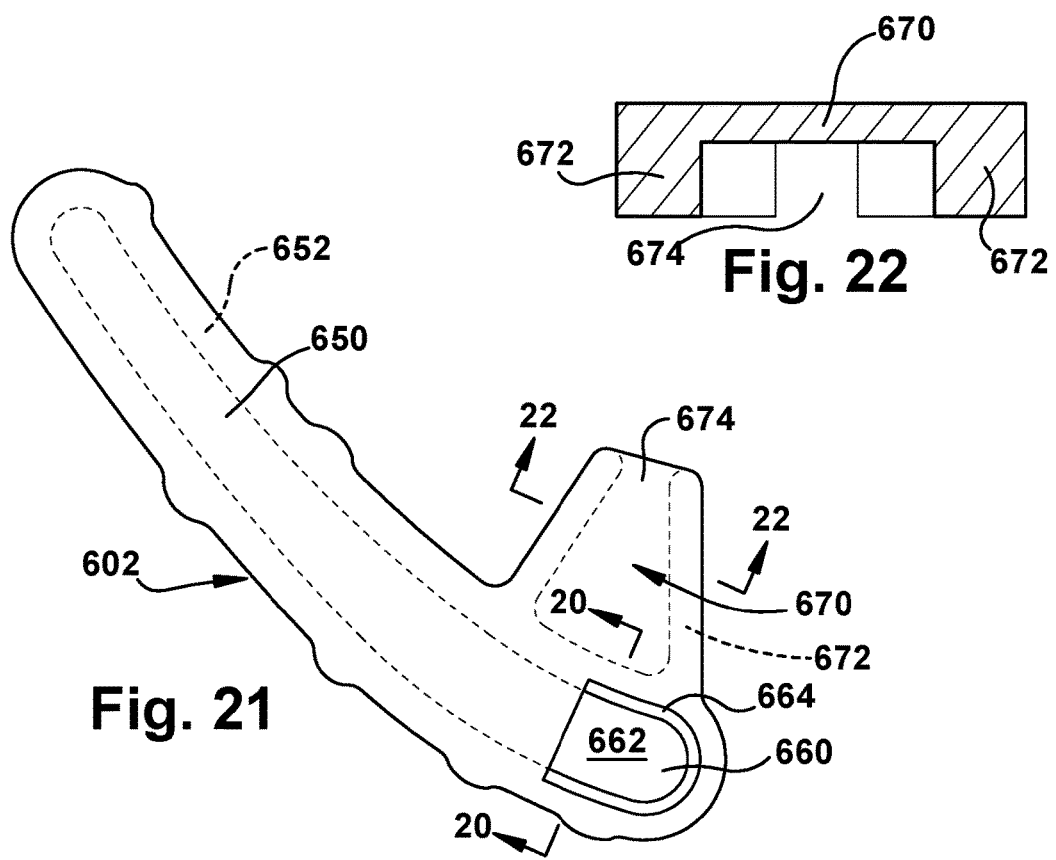

PROTECTION SYSTEM WITH GASKET FOR CERAMIC CORE PROCESSING OPERATION AND RELATED METHOD

BACKGROUND OF THE INVENTION

The disclosure relates generally to investment casting, and more particularly, to a protection system for a ceramic core for core processing operations, and a related method.

Investment casting is used to manufacture a large variety of industrial parts such as turbomachine blades. Investment casting uses a casting article having a sacrificial material pattern to form a ceramic mold for the investment casting. Certain types of casting articles may include a ceramic core or insert within the sacrificial material pattern. The ceramic core is used to create a hollow structure in a final metal component, and may define an interior structure of the component. The ceramic core is a part of the ceramic mold used during the investment casting. Ceramic core(s) can include a large variety of intricate features that define an interior structure of the component, e.g., a number of cooling passages within a turbomachine blade. Ceramic cores can be cast, or additively manufactured to allow for rapid prototyping and manufacturing of the cores. The casting article is made by molding a sacrificial material fluid, such as hot wax or a polymer, about the ceramic core while it is positioned in a ceramic mold that defines the shape of the component surrounding the ceramic core. The hardened sacrificial material formed about the ceramic core defines the shape of the component for the investment casting. Each casting article, whether individually or in a collection of casting articles, can be dipped in a slurry and coated with a ceramic to form a ceramic mold for the investment casting. Once the sacrificial material is removed from the ceramic mold, the ceramic mold with the ceramic core therein can be used to investment cast the component using a molten metal, e.g., after pre-heating the ceramic mold. Once the molten metal has hardened, the ceramic mold can be removed, and the ceramic core can be removed using a leachant. The component can then be finished in a conventional fashion, e.g., heat treating and conventional finishing.

Investment casting is a time consuming and expensive process, especially where the component must be manufactured to precise dimensions. In particular, where precise dimensions are required, formation of the casting article must be very precise. Each mold used to form the casting article can be very costly, and can take an extensive amount of time to manufacture. Consequently, any changes or flaws in the ceramic core or the component can be very expensive and very time consuming to address.

Certain core processing operations present challenges during the overall investment casting process. One core processing operation that poses issues is referred to as 'rework' of the ceramic core after its formation, e.g., through casting or additive manufacturing. The rework may include removal of material or addition of material to the ceramic core. For example, supports used during the formation of the ceramic core may need to be removed, or ceramic core features must be built up by addition of ceramic to provide a desired shape. The rework of the ceramic core can be very challenging where the ceramic core includes open areas that must remain open despite rework processing that creates foreign material such as but not limited to: ceramic debris from removal processing, or excess ceramic slurry from additive processing. For example, a channel on an exterior surface of the ceramic core may be used to create a rib in a final metal component, and is one type of structure that is commonly located on an exterior surface of a ceramic core. In some instances, a channel may pass around a boss or other raised structure in its path. The boss may be provided to support an internal structure of the ceramic core. Due to the size and intricacy of the channel extending around the boss or other raised structure, it is oftentimes impossible to prevent foreign material from entering the channel during rework. In these instances, very delicate repair completed by a highly experienced technician may be necessary, or the core may have to be scrapped. Both results are ideally avoided because of their time consumption and expense.

Casting with ceramic cores that include intricate or delicate ceramic core features can also pose a challenge. For example, intricate ceramic cores, such as those for a serpentine cooling passage in a turbomachine airfoil, may include very small ceramic core features that may break or otherwise be deformed from their intended shape during formation or rework. In some instances, rework of these very small ceramic core features is extremely difficult or impossible. In these instances, a ceramic core may need to be scrapped, which adds expense to the process.

BRIEF DESCRIPTION OF THE INVENTION

A first aspect of the disclosure provides a protection system for preventing a foreign material from lodging in a channel between and/or damage to adjacent ceramic core features during a core processing operation, the protection system comprising: a gasket sized and shaped to self-lock within the channel between adjacent ceramic core features in a ceramic core and prevent foreign material from lodging within the channel during the core processing operation.

A second aspect of the disclosure provides a method of preventing a foreign material from lodging in a channel between and/or damage to adjacent ceramic core features during a core processing operation, the method comprising: determining a geometrical characteristic of the channel and adjacent ceramic core feature; fabricating a gasket to fit and self-lock within the channel; positioning the gasket within the channel; and performing the core processing operation, wherein the gasket prevents the foreign material from lodging in the channel and damage to adjacent core features, reducing subsequent damage to the ceramic core compared to the channel without the gasket.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 15 shows an end view of another illustrative ceramic core.

FIG. 16 shows a plan view of a protection system including a gasket for use with the ceramic core of FIG. 15, according to an embodiment of the disclosure.

FIG. 17 shows a plan view of a protection system including a gasket for use with the ceramic core of FIG. 15, according to another embodiment of the disclosure.

FIG. 18 shows a cross-sectional view of the gasket of FIG. 17 along line 18-18.

FIG. 19 shows a plan view of a protection system including a gasket for use with the ceramic core of FIG. 15, according to another embodiment of the disclosure.

FIG. 20 shows a cross-sectional view of the gasket of FIGS. 19 and 21 along line 20-20.

FIG. 21 shows a plan view of a protection system including a gasket for use with the ceramic core of FIG. 15, according to yet another embodiment of the disclosure.

FIG. 22 shows a cross-sectional view of the gasket of FIG. 19 along line 22-22.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant structure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a protection system for preventing foreign material from lodging in a channel between and/or damage to adjacent ceramic core features during a core processing operation. The protection system includes a gasket sized and shaped to self-lock within the channel between adjacent ceramic core features in a ceramic core and prevent foreign material from lodging within the channel during the core processing operation. A method may include determining a geometrical characteristic of the channel and adjacent ceramic core feature; fabricating a gasket to fit and self-lock within the channel; positioning the gasket within the channel; and performing the core processing operation. The gasket prevents the foreign material from lodging in the channel, reducing subsequent damage to the ceramic core compared to the channel without the gasket. The ceramic core processing may include rework, e.g., removal or addition of ceramic from the core, but also may include the actual casting of the component using the ceramic core as part of a casting article with the gasket in-place.

Figure 1:
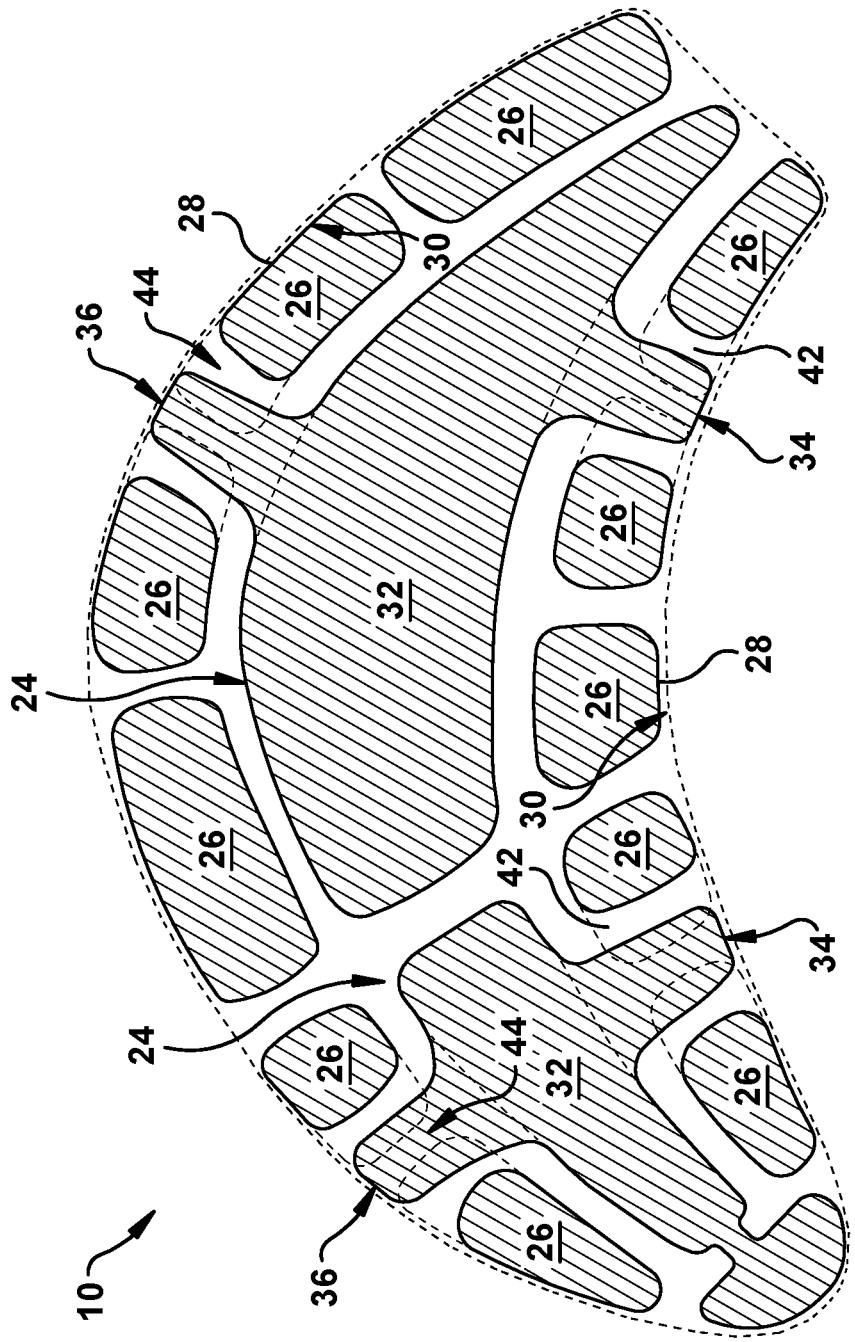
FIG. 1 shows a cross-sectional view of an illustrative ceramic core.
Figure 2:
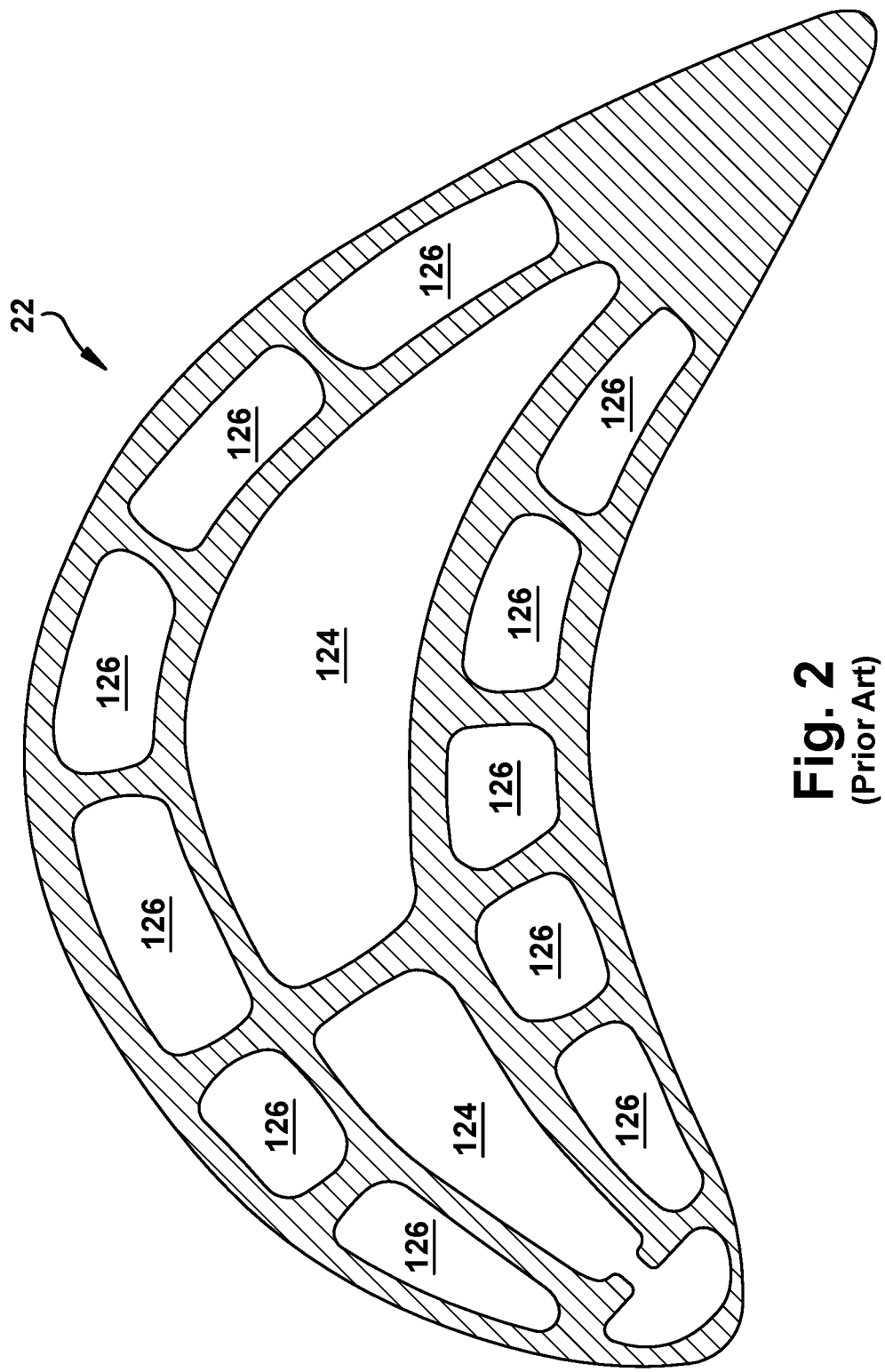
FIG. 2 shows a cross-sectional view of a conventional multiwall airfoil formed using the ceramic core of FIG. 1.

Referring to FIG. 1, an illustrative ceramic core 10 is shown. As understood in the field, ceramic cores can be used to form a large variety of final metal components during investment casting. Embodiments of the disclosure are described herein using multiwall airfoils of a turbomachine blade as example components. FIG. 2 shows a cross-sectional view of a multiwall airfoil 22 formed using ceramic core 10. Ceramic core 10 is used during the casting process of multiwall airfoil 22 (FIG. 2) in a conventional fashion, e.g., to form a casting article with a sacrificial material before exterior ceramic slurry formation for the ceramic mold, and in the ceramic mold during the actual molten metal investment casting. Ceramic core 10 can be made using any now known or later developed processes, e.g., casting, additive manufacturing, etc. As depicted in detail in FIG. 1, ceramic core 10 includes one or more center plenum sections 24, which are configured to form center plenums 124 (FIG. 2) of multiwall airfoil 22, and a plurality of outer passage sections 26, which are configured to form outer cooling passages 126 (FIG. 2) of multiwall airfoil 22.

Ceramic core 10 has an exterior surface 28 that is at least partially defined by exterior surfaces 30 of outer cooling passages 26.

Figure 3:
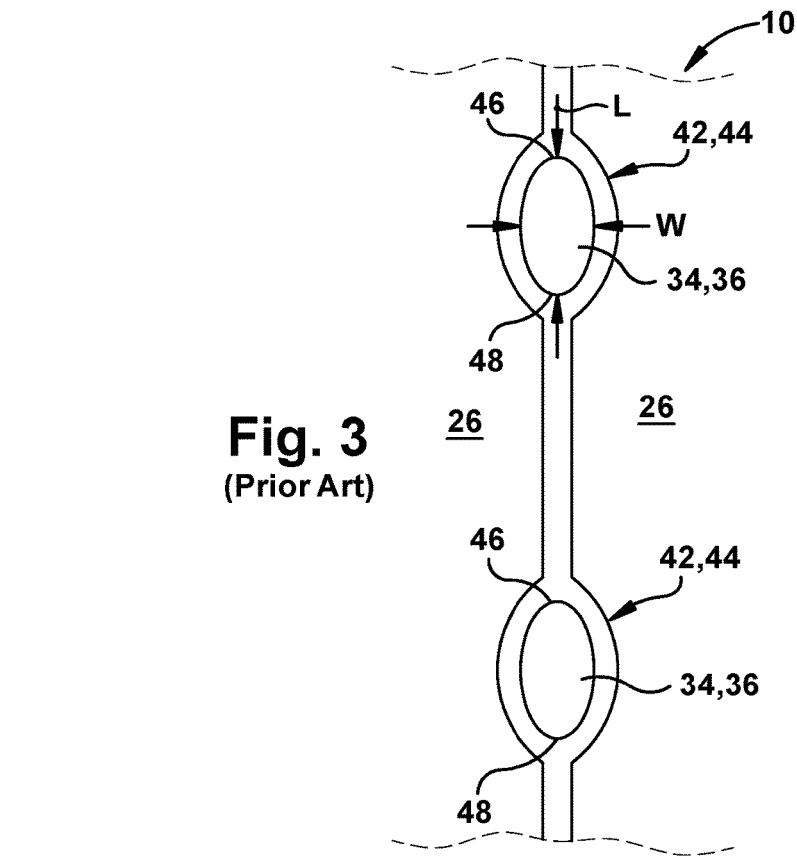
FIG. 3 shows a side view of a number of bosses in the ceramic core of FIG. 1.

For purposes of description, one illustrative ceramic core feature to which embodiments of a protection system may be employed is a boss in ceramic core 10. More particularly, each center plenum section 24 includes a center section 32, and at least one boss 34, 36. Boss(es) 34, 36 extend outwardly from center section 32 of center plenum section 24 to, but not beyond, exterior surface 28 of ceramic core 10. Each boss 34 may be located on a "pressure" or concave side of ceramic core 10, corresponding to the pressure side of a multiwall airfoil 22 (FIG. 2) formed using ceramic core 10. Similarly, each boss 36 may be located on the "suction" or convex side of ceramic core 10, corresponding to a suction side of a multiwall airfoil 22 (FIG. 2) formed using ceramic core 10. Bosses 34, 36 may be configured to control the position, and prevent the movement of, center plenum sections 24 during firing during molding of ceramic core 10, e.g., when in setter blocks of a shaping mold, or during use of ceramic core 10. As shown in FIGS. 1 and 3, each boss 34, 36 may extend outwardly from a respective center plenum section 24 between a pair of outer passage sections 26.

As shown in FIG. 3, each boss 34, 36 may have a substantially elliptical cross-sectional configuration. Each boss 34, 36 may thus have a first vertex 46 and a second vertex 48 (axes and co-vertices not labeled). A channel 42, 44 diverges around first vertex 46 of a respective boss 34, 36 and converges at second vertex 48 of respective boss 34, 36. To limit turbulence and pressure loss of coolant flowing through outer cooling passages 126 in multiwall airfoil 22 (FIG. 2) corresponding to outer passage sections 26 (FIG. 1) of ceramic core 10 on either side of boss(es) 34, 36, boss(es) 34, 36 may have a length (L on major axis) to width (W on minor axis) ratio of about 3:1 to about 10:1. In a particular embodiment, a length to width ratio of about 7:1 may be used. Although described as elliptical, boss(es) 34, 36 may have any other suitable cross-sectional configuration such as but not limited to: diamond (see e.g., FIG. 9), polygonal (square, rectangular), circular or oval. Any number of boss(es) 34, 36 may be employed. Channel 42, 44 is elliptical about boss(es) 34, 36 and linear as they extend between boss(es) 34, 36, and as they extend away from boss(es) 34, 36.

Embodiments of the disclosure provide a protection system 200 for preventing a foreign material from lodging in channel 42, 44 between, or otherwise causing damage to, adjacent ceramic core features, e.g., a boss 34, 36 and outer passage sections 26, during a core processing operation. "Ceramic core features" can be any ceramic element of the ceramic core (e.g., bosses 34, 36), which as will be apparent from the embodiments described herein, can vary widely. "Foreign material" can include any matter that can enter a channel as described herein, and change the shape of that channel either temporarily or permanently including but not limited to: blended core material, core fill material, ceramic or other debris or dust, and ceramic slurry. In accordance with embodiments of the disclosure, a protection system 200 may include, among other things, a gasket 202 sized and shaped to self-lock within channel 42, 44 and prevent foreign material from lodging within the channel during the core processing operation. As used herein, "channel" can mean any open area between ceramic core features regardless of shape or size. Typically, the channel is an open area intended to be filled by molten metal during the casting process. As will be apparent from the description, the channel can have practically any shape including elliptical, linear and/or curvilinear. Further, "core processing operation" can include any operation relating to the core including but not limited to: rework in which material is added or removed from the core, and/or casting of the final metal component. As noted, rework of ceramic core 10 to remove or reduce the size of or add material to a ceramic core feature thereof can be challenging, especially in terms of preventing foreign material from lodging in channels 42, 44, or otherwise preventing damage to ceramic core features. Where exterior surface 28 includes complicated structure, rework may be impossible without protection system 200.

Figure 4:
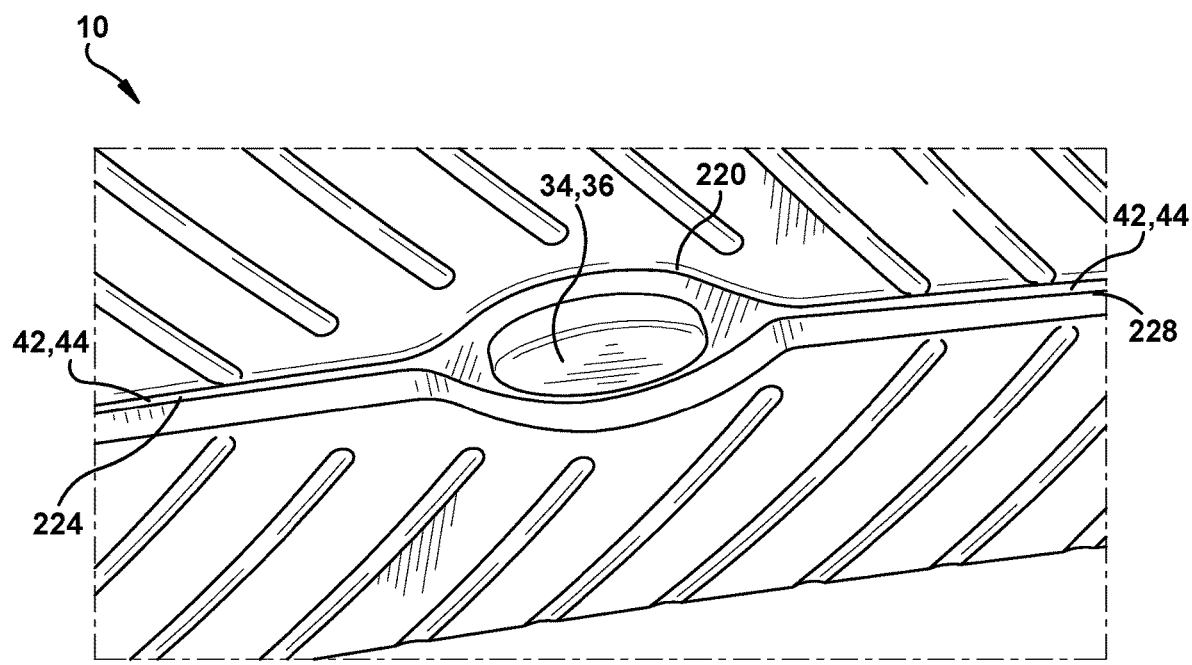
FIG. 4 shows a perspective view of a protection system including a gasket on part of the ceramic core of FIG. 1 according to embodiments of the disclosure.
Figure 5:
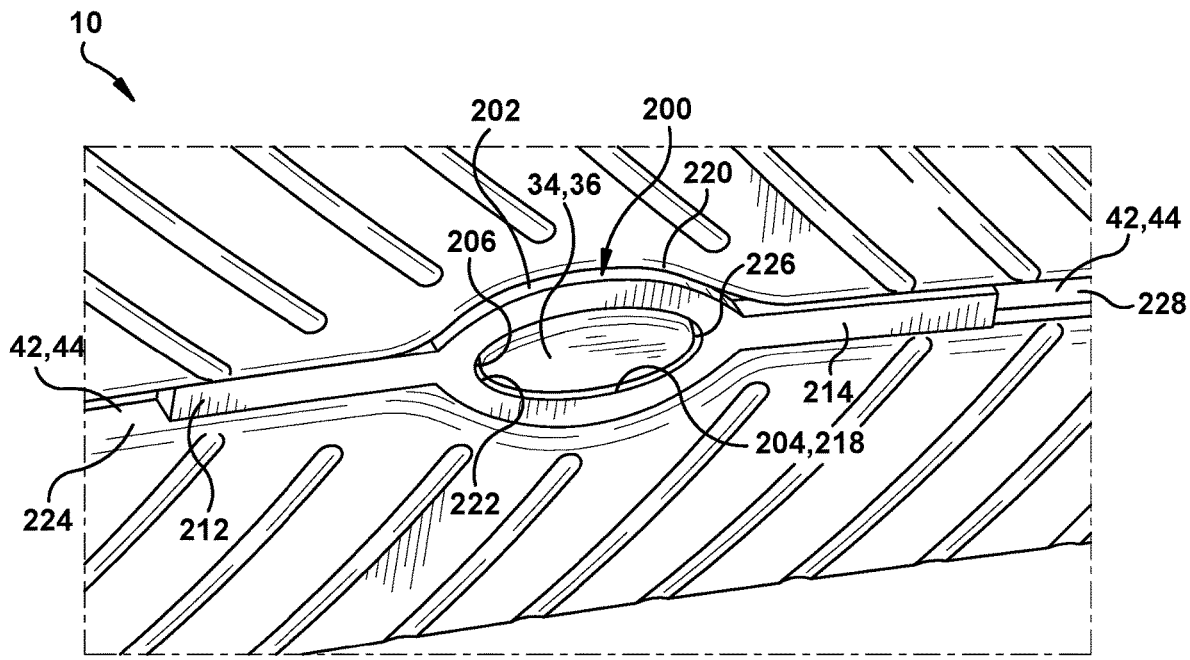
FIG. 5 shows a perspective view of a protection system including a gasket on part of the ceramic core of FIG. 1 according to another embodiment of the disclosure.
Figure 6:
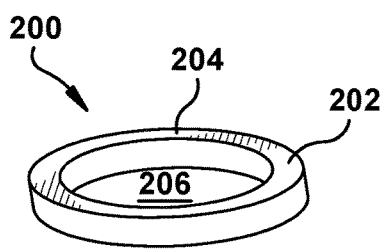
FIG. 6 shows a perspective view of the gasket of FIG. 4.
Figure 7:
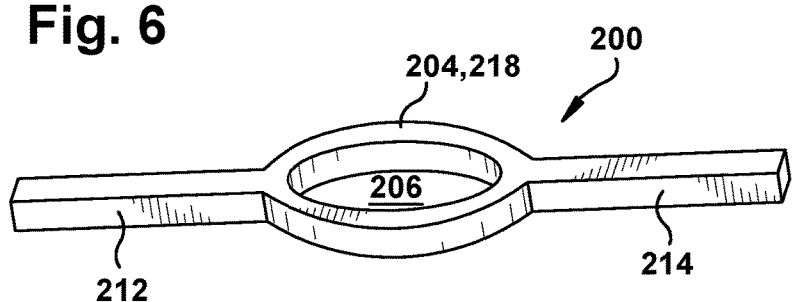
FIG. 7 shows a perspective view of the gasket of FIG. 5.

In one embodiment, shown in FIGS. 4-10, gasket 202 may having an open center body 204, i.e., having an open center 206, configured to surround at least a portion of at least one ceramic core feature, e.g., a boss 34, 36, in exterior surface 28 of ceramic core 10. FIGS. 4 and 5 show perspective views of embodiments of gaskets 202 in place in ceramic core 10, and FIGS. 6 and 7 show perspective views of gaskets 202 shown in FIGS. 4 and 5, respectively.

Figure 8:
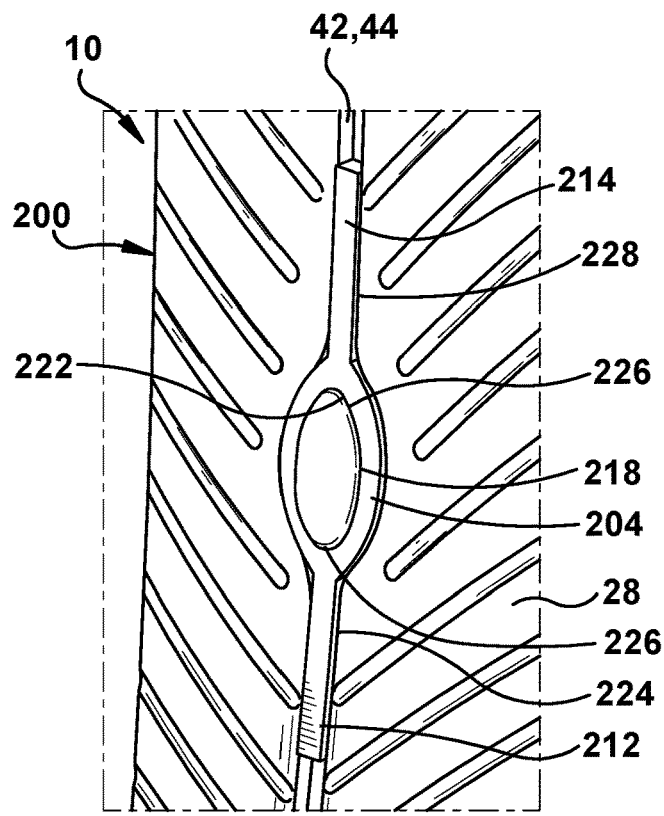
FIG. 8 shows a perspective view of the protection system of FIG. 5 during use with an adhesive sealing layer, according to embodiments of the disclosure.

Gasket 202 may have any shape necessary to mate with and self-lock in channel 42, 44, i.e., prevent it from falling out of the channel on its own. In the example shown in FIGS. 4 and 6, gasket 202 may have any shape configured to sealingly mate with boss 34, 36 in respective channel 42, 44 so as to prevent foreign material from lodging therein. Here, a respective channel 42, 44 in exterior surface 28 of ceramic core 10 surrounds boss 34, 26, and gasket 202 fills the channel about the boss. In FIGS. 4 and 6, gasket 202 has an elliptical shape so as to conform to elliptical bosses 34, 36, i.e., boss 34, 36 has an elliptical cross-section positioned within the channel. In another example shown in FIGS. 5, 7 and 8, gasket 202 further includes a first elongate member 212 extending from open center body 204, and a second elongate member 214 extending from open center body 204. Elongate members 212, 214 are configured to fill a portion of channel 42, 44 extending away from a respective boss 34, 36. First elongate member 212 may have a first length and second elongate member 214 may have a second length different than the first length. However, they may have the same length, if desired. As shown in FIGS. 5 and 8, open center body 204, first elongate member 212 and second elongate member 214 fit within channel 42, 44 in exterior surface 28 of ceramic core 10. Here, open center body 204 includes an elliptical body 218 having open center 206 for self-locking in an elliptical channel portion 220 of channel 42, 44 about elliptical boss 34, 36. Further, as shown in FIG. 5, first elongate member 212 extends from a first vertex 222 of elliptical body 218 for self-locking in a first elongate channel portion 224 of channel 42, 44, and second elongate member 214 extends from a second vertex 226 of elliptical body 218 for self-locking in a second elongate channel portion 228 of channel 42, 44. Elliptical body 218 prevents foreign material from lodging in channel 42, 44 about, or other damage to, a respective boss 34, 36, and elongate members 212, 214 prevent foreign material from lodging in, or other damage to, channel 42, 44 as it extends away from a respective boss 34, 36.

Gasket 202 may have any cross-sectional shape desired, but in most cases is configured to mate with a shape of, and self-lock in, channel 42, 44. In the examples shown, gasket 202 has a polygonal cross-section, e.g., square or rectangular, but it could be, for example, elliptical, oval, circular, etc. Typically, gasket 202 (e.g., open center body 204 (elliptical body 218) and, if provided, first elongate member 212 and second elongate member 214) each have a polygonal cross-section configured to self-lock in a cross-section of channel 42, 44 in exterior surface 28 of ceramic core 10.

Figure 9:
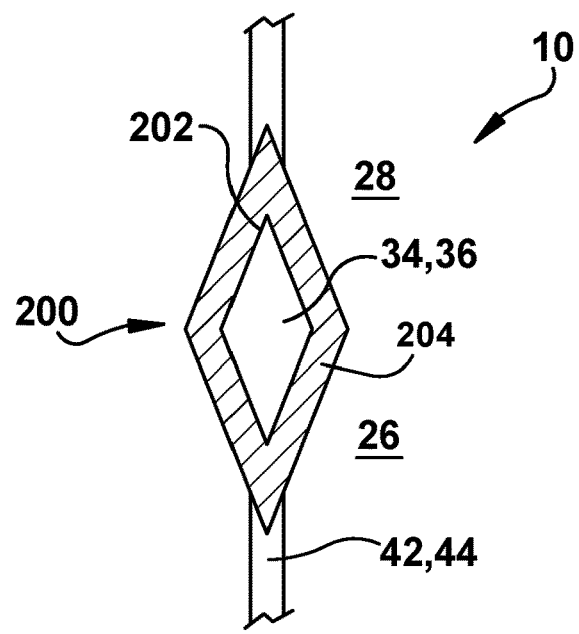
FIG. 9 shows a plan view of a protection system including a gasket on a ceramic core according to another embodiment of the disclosure.
Figure 10:
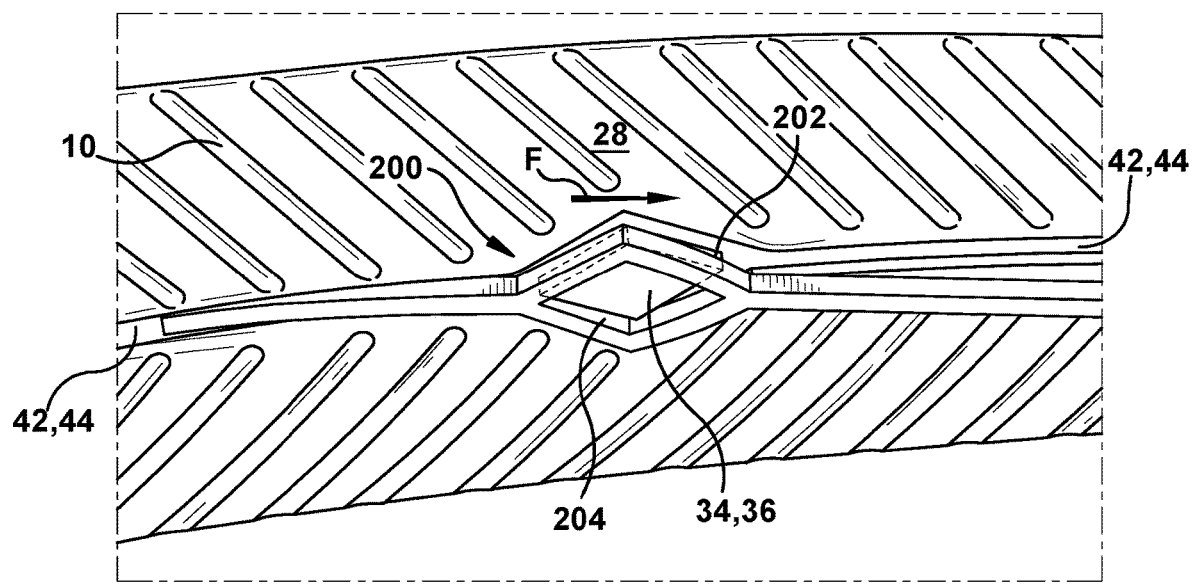
FIG. 10 shows a perspective view of positioning of a gasket of a protection system according to an embodiment of the disclosure.

FIGS. 9 and 10 show another embodiment, similar to that of FIGS. 4-8, but having a differently shaped inner ceramic core feature 34, 36 in the form of a boss 34, 36 that is diamond shaped. Here, gasket 202 has an open center body 204 that his diamond shape.

Figure 11:
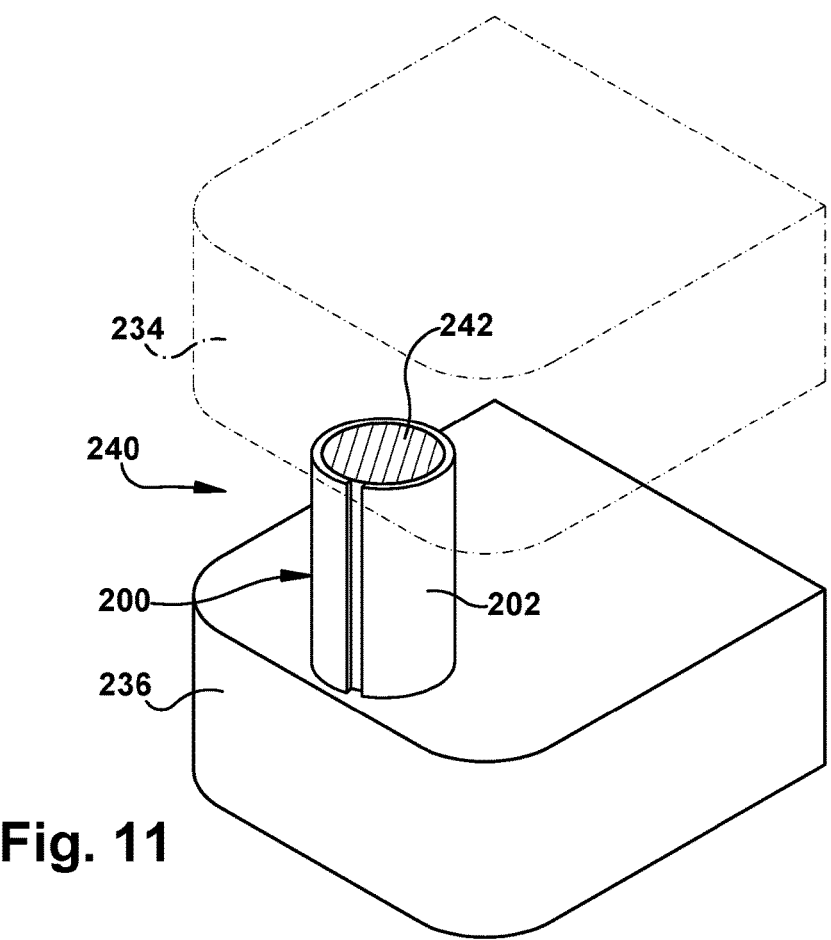
FIG. 11 shows a perspective view of a protection system including a gasket on a ceramic core according to yet another embodiment of the disclosure.

FIG. 11 shows another example of a different form of a channel 240 between ceramic core features in the form of elements 234, 236, and a post 242. More particularly, ceramic core features include two elements 234, 236 separated by channel 240, and post 242 extending between elements 234, 236. In FIG. 11, gasket 202 prevents foreign material from lodging within channel 240 near post 242 by having gasket 202 self-lock in channel 240 by engaging about post 242. Gasket 202 may have a split tubular configuration so to allow expansion about post 242 for positioning.

Figure 12:
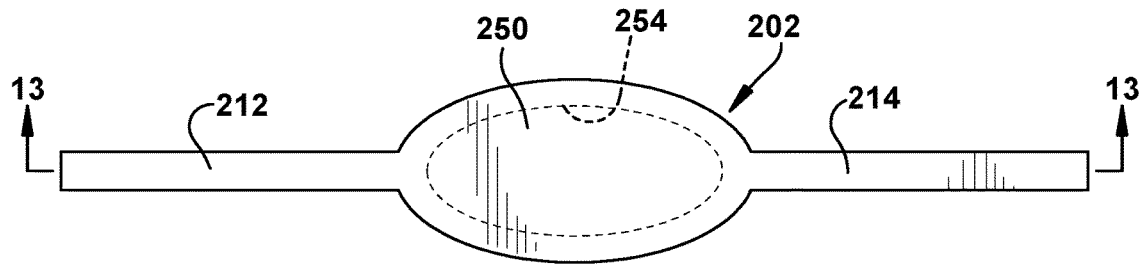
FIG. 12 shows a plan view of a protection system including a gasket according to another embodiment of the disclosure.
Figure 13:
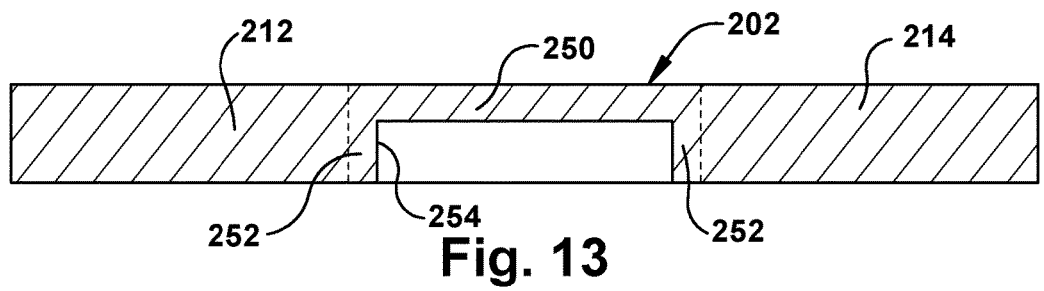
FIG. 13 shows a cross-sectional view of the gasket of FIG. 12 along line 13-13.
Figure 14:
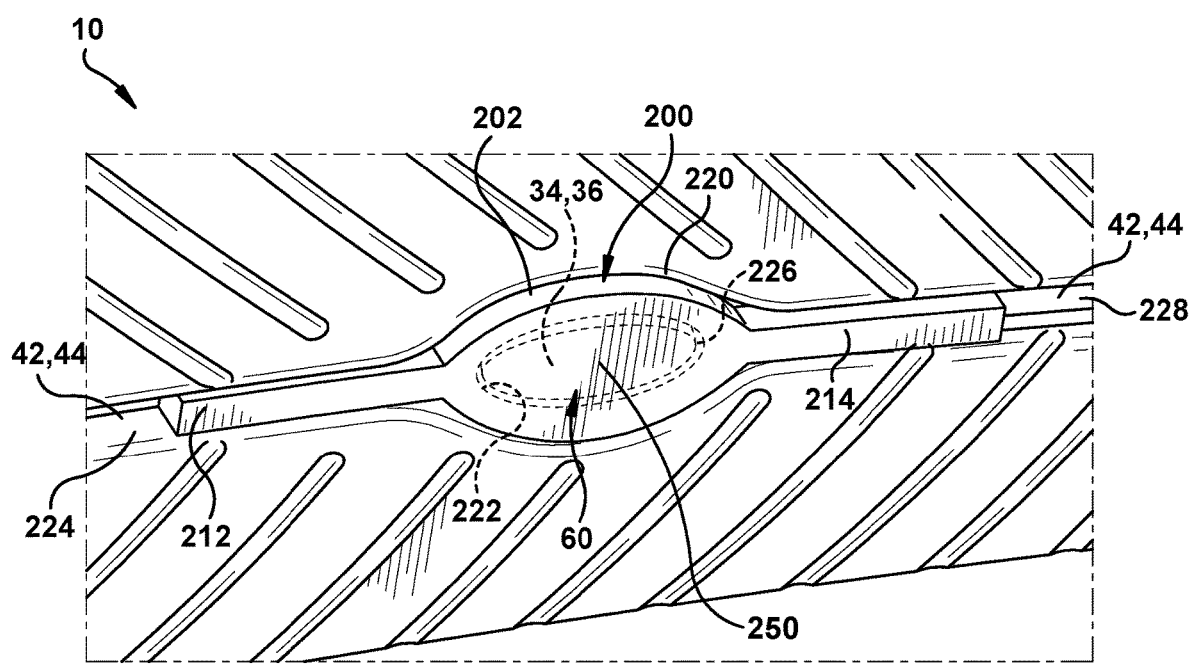
FIG. 14 shows a perspective view of a protection system including the gasket of FIGS. 12-13 on a ceramic core.

FIGS. 12-14 show another embodiment of gasket 202. Here, ceramic core features are the same as they are in FIGS. 4-5, e.g., an elliptical boss 34, 36 within channel 42, 44 (FIG. 4). However, in this embodiment, gasket 202 includes a cover 250 configured to cover a portion of a ceramic core feature, e.g., elliptical boss 34, 36, adjacent channel 42, 44 (FIG. 14), and a channel engaging portion 252 (FIG. 13) extending from cover 250 (and optionally first and second elongate members 212, 214) to self-lock in at least a portion of channel 42, 44. In this example, gasket 202 further includes first elongate member 212 extending from cover 250, and a second elongate member 214 extending from cover 250. Elongate members 212, 214 are configured to fill a portion of channel 42, 44 extending away from a respective boss 34, 36. First elongate member 212 may have a first length and second elongate member 214 may have a second length different than the first length. However, they may have the same length, if desired. However, elongate members 212, 214 are optional. As shown in FIG. 14, cover 250 covers boss 34, 36, and channel engaging portion 252 (with first elongate member 212 and second elongate member 214, if provided) fit within channel 42, 44 in exterior surface 28 of ceramic core 10. Here, channel engaging portion 252 includes an elliptical body 254 for self-locking in an elliptical channel portion 220 of channel 42, 44 about elliptical boss 34, 36. Further, first elongate member 212 extends from a first vertex 222 of cover 250 for self-locking in first elongate channel portion 224 of channel 42, 44, and second elongate member 214 extends from a second vertex 226 of cover 250 for self-locking in a second elongate channel portion 228 of channel 42, 44. Here, gasket 202 prevents foreign material from lodging in channel 42, 44 and prevents foreign material from lodging on a respective boss 34, 36, and elongate members 212, 214 prevent foreign material from lodging in channel 42, 44 as they extend away from a respective boss 34, 36. Gasket 202 also prevents other damage, e.g., from hits with hard surfaces, etc.

FIG. 15 shows a plan view of another illustrative ceramic core 310 having different ceramic core features compared to that of previous embodiments. Ceramic core 310 may be used for casting, for example, a cooling circuit geometry for a turbomachine tip shroud cooling geometry, such as described in U.S. Pat. No. 7,686,581, which is hereby incorporated by reference. In this example, ceramic core 310 includes ceramic, curvilinear core features 312, 314, 316, 318 and 320 that may each form part of the cooling circuit. Ceramic core 310 has an exterior surface 328 made up, at least in part, by ceramic core features 312, 314, 316, 318, 320. Channel 340 has a complex, oblong, curvilinear shape with portions that are linear, e.g., portion 340A. FIG. 15 also shows a defect 322 on ceramic core feature 312, which requires rework that may cause foreign material to enter channel 340 or damage to adjacent core features 316, 318 during the rework operation. FIGS. 16 and 17 show plan views of gaskets 302 and 402 that may be used to prevent foreign material from lodging in channel 340 (FIG. 15), and/or to prevent other damage. FIG. 16 shows an embodiment in which gasket 302 includes an open center body 304 (with open center 306) configured to surround at least one ceramic core feature, e.g., 312, in an exterior surface 328 of ceramic core 310. Open center body 304 may have any size and shape configured to mate and self-lock in channel 340 (FIG. 15). FIG. 17 shows gasket 402 with a cover 450 configured to cover a portion of a ceramic core feature, e.g., 312, adjacent channel 340, and a channel engaging portion 452 extending from cover 450 to self-lock in at least a portion of channel 340 (FIG. 15). FIG. 18 shows a cross-sectional view along line 18-18 in FIG. 17 showing cover 450 and channel engaging portion 452. Channel engaging portion 452 may have any size and shape configured to mate and self-lock in channel 340 (FIG. 15). While cover 450 is shown to have a similar shape to that of channel 340 (FIG. 15), that is not necessary in all instances, e.g., it may cover at least portions of other ceramic core features than just feature 312 (FIG. 15).

FIG. 19 shows a plan view of another embodiment of a gasket 502, and FIG. 20 shows a cross-sectional view along line 20-20 in FIG. 19. Here, gasket 502 is similar to gasket 302, shown in FIG. 16. For example, gasket 502 includes a cover 550 configured to cover a portion of a ceramic core feature, e.g., 312, adjacent channel 340 (FIG. 15), and a channel engaging portion 552 extending from cover 550 to self-lock in at least a portion of channel 340 (FIG. 15). Channel engaging portion 552 may have any size and shape configured to mate and self-lock in channel 340 (FIG. 15). While cover 550 is shown to have a similar shape to that of channel 340 (FIG. 15), that is not necessary in all instances, e.g., it may cover at least portions of other ceramic core features than just feature 312 (FIG. 15). In contrast to FIG. 17, gasket 502 includes an opening 560 in cover 550 to allow access to a portion 562 of ceramic core feature, e.g., 312, exposed by the opening. For example, opening 560 may be sized and positioned to allow access to defect 322 (FIG. 15). Opening 560 may be provided to allow material to be removed, e.g., by grinding, but without allowing the material to move outside of opening 560, and/or it may be provided to control addition of material, e.g., by way of a blended core material, core fill material and/or ceramic slurry. Opening 560 may have a size and shape to expose any desired amount and shape of the relevant ceramic core feature, e.g., 312. As shown best in FIG. 20, gasket 502 may optionally include a dam element 564 about at least a portion of opening 560 to prevent material exiting from opening 560 from entering channel 340 (FIG. 15), e.g., ceramic slurry used to add ceramic to ceramic core feature 312. Dam element 564 may surround all or just a portion of opening 560.

FIG. 21 shows a plan view of another embodiment of a gasket 602, and FIG. 22 a cross-sectional view along line 22-22 in FIG. 21. Here, gasket 602 is similar to gasket 502, shown in FIGS. 19 and 20. FIG. 20 also shows a cross-section along line 20-20 in FIG. 21. With reference to FIGS. 20 and 21, gasket 602 includes a cover 650 configured to cover a portion of a ceramic core feature, e.g., 312, adjacent channel 340 (FIG. 15), and a channel engaging portion 652 extending from cover 650 to self-lock in at least a portion of channel 340 (FIG. 15). Channel engaging portion 652 may have any size and shape configured to mate and self-lock in channel 340 (FIG. 15). While cover 650 is shown to have a similar shape to that of channel 340 (FIG. 15), that is not necessary in all instances, e.g., it may cover at least portions of other ceramic core features than just feature 312 (FIG. 15). Gasket 602 also includes an opening 660 in cover 650 to allow access to a portion 662 of ceramic core feature, e.g., 312, exposed by the opening. Opening 660 may be provided to allow material to be removed, e.g., by grinding, but without allowing the material to move outside of opening 660, or it may be provided to control addition of ceramic, e.g., by way of a ceramic slurry. Opening 660 may have a size and shape to expose any desired amount and shape of the relevant ceramic core feature, e.g., 312. As shown best in FIGS. 20 and 21, gasket 602 may also optionally include a dam element 664 about at least a portion of opening 660 to prevent material exiting the opening 660 from entering channel 340 (FIG. 15), e.g., ceramic slurry used to add ceramic to ceramic core feature 312. Dam element 664 may surround all or just a portion of opening 660. In contrast to FIGS. 19 and 20, gasket 602 may also include a supplemental cover 670 that covers another ceramic core feature, e.g., 316 (FIG. 15). Supplemental cover 670 may be integral with cover 650, and may include a supplemental channel engaging portion 672 extending from supplemental cover 670 to self-lock in at least a portion of channel 340 (FIG. 15) about ceramic core feature 316 (FIG. 15). Supplemental cover 670 prevents material from entering channel 340 and further prevents damage to adjacent core feature 316 during various core processing operations such as grinding, blending or filling. In contrast to FIG. 19, supplemental channel engaging portion 672 may extend only about a portion of supplemental cover 670 (see open end 674 in FIGS. 20, 21) to allow a portion of ceramic core feature 316 to extend therethrough.

In any of the embodiments described heretofore, the gasket may include a flexible material such as but not limited to a thermoplastic polyurethane such as those available from NinjaFlex®. In other embodiments, the gasket may include multiple materials having different rigidities, e.g., materials of different flexibility and/or different hardness, to address positioning and self-locking of the gasket and required stiffness or hardness to protect ceramic core features. For example, in the FIGS. 17, 19 and 21 embodiments, covers 350, 450, 550 may have a more rigid material, while channel engaging portions 352, 452, 552 may include more pliable or flexible material. Additionally, gaskets 302, 402, 502 and 602 may be sized and shape to partially surround core feature 312. For example, gaskets 302, 402, 502 and 602 may extend around approximately 50% of core feature 312.

While particular embodiments of a ceramic core feature have been illustrated as a boss or a curvilinear cooling circuit geometry, it is understood that ceramic core features may include both types of structure (e.g., with a boss in a channel that is curvilinear), and that the teachings of the disclosure are applicable to a wide variety of alternative core features. That is, the channel can be an elliptical, linear and/or curvilinear in shape.

Figure 23:
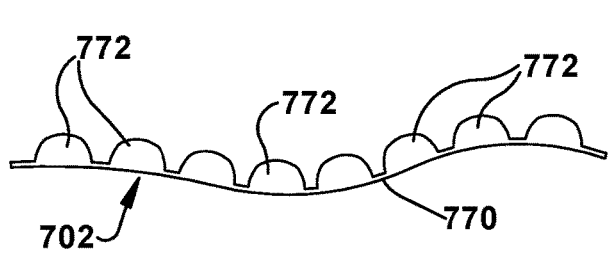
FIG. 23 shows a plan view of a protection system including a gasket according to another embodiment of the disclosure.
Figure 25:
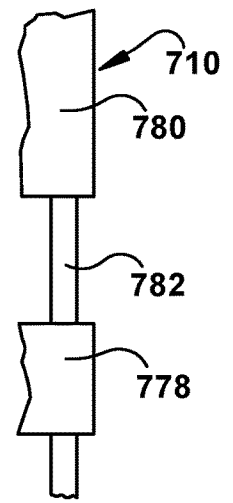
FIG. 25 shows a side view of the illustrative ceramic core of FIG. 24 including a broken ceramic core feature.
Figure 24:
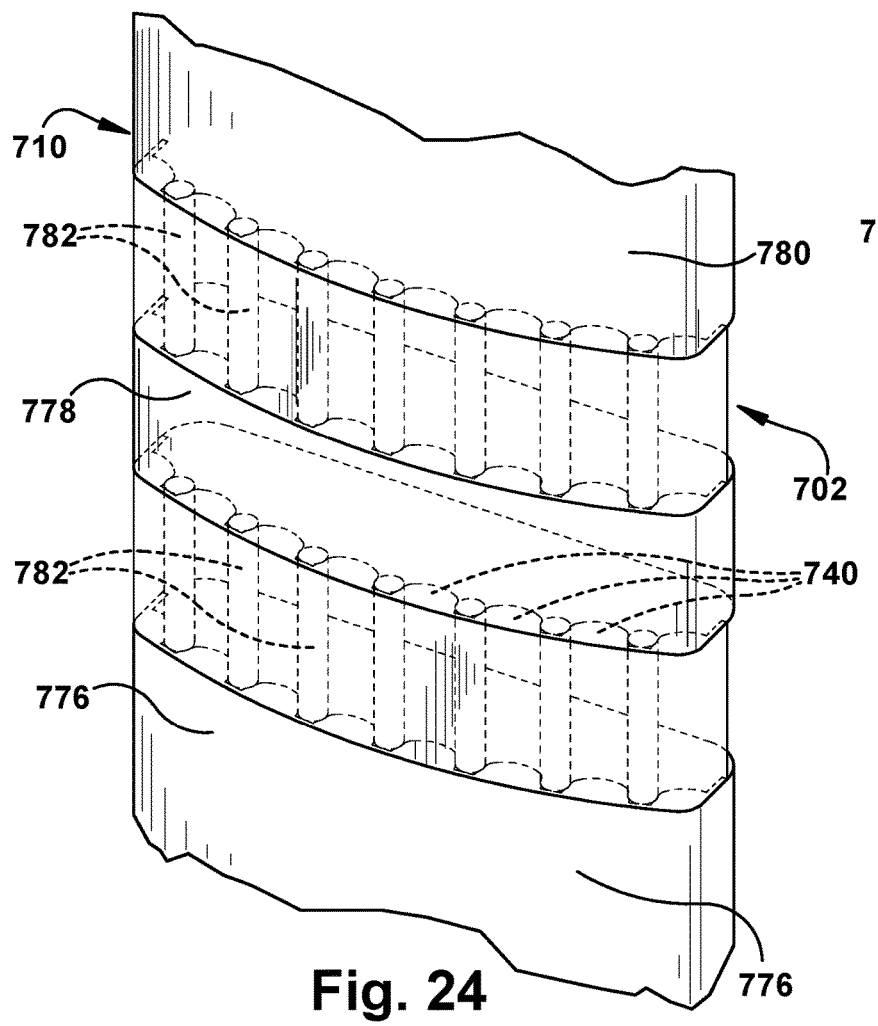
FIG. 24 shows a side view of an illustrative ceramic core with a protection system including a gasket according to FIG. 13.

FIGS. 23-25 show another embodiment of a gasket 702 (FIGS. 23, 24). Gasket 702 may be used during casting, i.e., with the gasket in-place on an illustrative ceramic core during casting. FIG. 23 shows a plan view of gasket 702, FIG. 24 shows a side view of illustrative ceramic core 710 with gasket 702 in-place thereon, and FIG. 25 shows a side view of ceramic core 710 with a broken ceramic core feature 774. In this example, ceramic core 710 may be for forming cooling passage(s) of turbomachine airfoil having a bottom portion 776, a serpentine portion 778 and a top portion 780. In addition, between serpentine portion 778 and each of bottom portion 776 and top portion 780, ceramic core 710 includes a number of ceramic core features in the form of pins 782. It is understood that pins 782 provide structural integrity to ceramic core 710, but also form cooling passages coupling cooling passages of serpentine portion 778 and each of top and bottom portions 776, 780 (detail not shown for clarity) in the final airfoil. In ceramic core 710, a channel 740 is formed between pins 782 and portions 776, 778 and 780. Here, one broken ceramic core feature 774, e.g., broken pin 782B (FIG. 25), may be insufficient to cause a user to scrap the ceramic core. (In contrast, where too many pins 782 are broken, the structural integrity of ceramic core 710 may be lost, requiring it to be scrapped.) Broken pin 782B may also be impossible to repair because, for example, it may be too close to other structure, or so small in dimension that repair is impossible. Pins 782 may break during formation, rework or during casting, e.g., in terms of casting, pins may break during the firing stages of the investment casting process. Breaking of pins 782 cannot always be controlled.

As shown best in FIG. 23, gasket 702 may include a length of material 770 having at least one protrusion 772 extending therefrom. Protrusion(s) 772 is/are configured to self-lock in channel 740, e.g., about pins 782 or other ceramic core features 774. Gasket 702 may have a length made to fit around either two pins 782, or the entire region of pins 782, e.g., between portions 776, 778 or 778, 780. Protrusions 772 may be size to self-lock between pins 782, i.e., they have same spacing as between pins 782 in channel 740. Gasket 702 may also be made to the size of channel 740, height-wise as shown in FIG. 24. In one embodiment, heat may be applied to gasket 702 to melt it around pins 782 and to ceramic core 710. This step may would add extra support to ceramic core 710 and pins 782 during casting, but may not be necessary in all cases. Gasket 702 may remain in place on ceramic core 710 during casting. While only the FIGS. 23-25 embodiment has been described relative to using the gasket in place during casting of the final metal component, it is emphasized that any of the gaskets described herein may be used in this manner. Where the gasket is used in place during casting, the gasket may be formed of a material capable of disintegrating during the casting, e.g., dissolving, evaporating or melting, such that is does not impact the formation of the casting article. Possible materials may include but are not limited to: Ninjaflex material from Ninjatek, Mandheim, Pa., or Irogran (thermoplastic polyurethane) available from Filastruder, Snellville, Ga.

In any of the embodiments described herein, the gaskets may be made using any now known or later developed process such as but not limited to: additive manufacturing, molding in place, stamping, or molding via conventional processes. In any event, the gaskets can be custom made to fit any desired structure where foreign material may lodge in the channel. The gaskets may have a size to create self-locking, tight fit with the channel(s) into which it is placed, i.e., the gasket as a whole may self-lock or just select channel engaging portions thereof. For example, a channel may have a width of approximately 1.27 millimeters (mm) (0.05 inches) to 12.7 mm (0.5 inches), and gasket and/or channel engaging portion (whichever is appropriate) may have a width that is 0.025 mm (0.001 inches) to 0.127 mm (0.005 inches) wider than the channel. In this fashion, an interference fit to self-lock can be created.

Embodiments of the disclosure may also include a method of use of the gaskets. In a first step, a geometrical characteristic of the channel and adjacent ceramic core feature may be determined. This step may include performing any now known or later developed process to identify geometrical characteristics, e.g., manual sketching, obtaining directly from a computer aided design (CAD) model, scanning with a light source such as Blue Light or laser scanning, 3D imaging, coordinated measurement machine (CMM) or other manual or automated measurement, computer aided graphics (CAD) evaluation of ceramic core design, etc. The gasket can then be fabricated to fit and self-lock within the channel, as described herein. More specifically, the gasket can be additive manufactured, molded in place, stamped, or molded via conventional processes. In any event, the gaskets can be custom made to fit any desired structure where foreign material may lodge in the channel, and may take any form within the scope of this disclosure. As noted, the gaskets may have a size to create self-locking, tight fit with the channel(s) into which it is placed, i.e., the gasket as a whole or just channel engaging portions or sub-portions (for example, gasket may have some sections designed for tight fit and other sections with loose fit). The gasket can then be positioned within the channel. For example, as shown in FIG. 10 relative to the FIG. 9 embodiment, because gasket 202 is made of flexible material, a force F may be applied to flex it to mate in a self-locking fashion in channel 42, 44, e.g., about a boss 34, 36. In FIG. 9, boss 34, 36 is diamond in cross-section. As shown in FIGS. 4 and 5, where boss 34, 36 is elliptical, open center body 204 is positioned in elliptical channel portion 220 of channel 42, 44 about a respective elliptical boss 34, 36. Where provided, first elongate member 212 extending from a first vertex 222 of open center body 204 is positioned in first elongate channel portion 224 of channel 42, 44, and second elongate member 214 extending from second vertex 226 of elliptical body 218 is positioned in second elongate channel portion 228 of channel 42, 44. A similar process may be carried out for the diamond shaped embodiment of FIG. 9, or any of the other embodiments described herein. Each of the positioning steps can happen in any order desired, e.g., one elongate member, then elongate body, then the latter elongate member. Each gasket described herein can be self-locked into a respective channel in a similar fashion.

Figure 26:
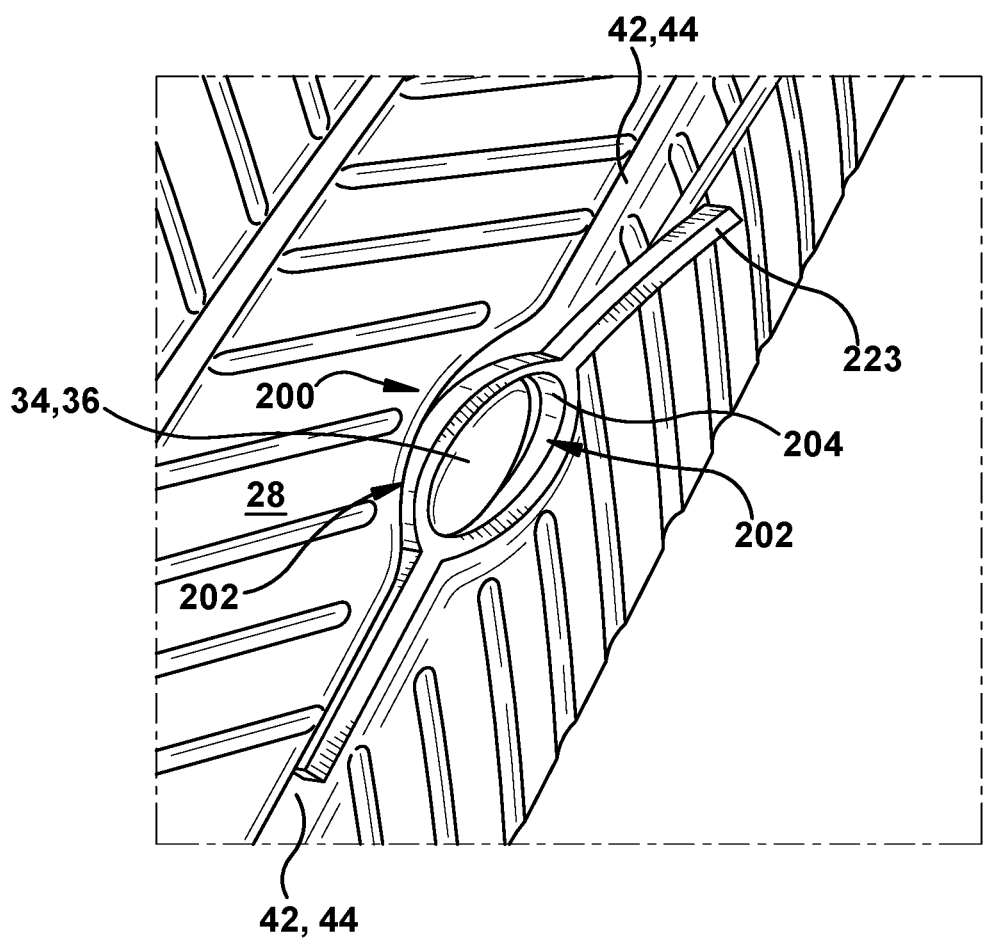
FIG. 26 shows a perspective view of removal of a protection system including a gasket according to embodiments of the disclosure.

The method may also include performing the core processing operation. This step may include, for example, any process to modify the ceramic core, e.g., rework to add or remove material. In one embodiment, as shown in an example in FIG. 26, the gasket may be removed before proceeding with the rest of the investment casting process. The gasket may be removed using any now known or later developed technique, using a tool like a pick 223 to start to pull it out of the channel, and then pulling the rest out by hand. In an alternative embodiment, as described relative to the FIGS. 23-25 embodiment, but applicable to all embodiments, casting the final metal component may occur with ceramic core 10 (FIG. 1) with the gasket in place. That is, the gasket is not removed. In this case, the gasket may be formed of a material capable of disintegrating during the casting, e.g., dissolving, evaporating or melting, such that is does not impact the formation of the casting article. The material may include any of the aforementioned materials. Here, the gasket prevents foreign material from lodging in the channel, but also may provide additional support to the ceramic core.

Embodiments of the disclosure provide a system 200 with a gasket that can be customized to fit where foreign material is not wanted during core processing operations, reducing subsequent damage to the ceramic core compared to the channel without the gasket. Optionally, the gasket can stay in place during casting of the final metal component.

The foregoing drawings show some of the processing associated according to several embodiments of this disclosure. In this regard, each drawing represents a process associated with embodiments of the method described. It should also be noted that in some alternative implementations, the acts noted in the drawings may occur out of the order noted in the figure or, for example, may in fact be executed substantially concurrently or in the reverse order, depending upon the act involved. Also, one of ordinary skill in the art will recognize that other well-known steps of the investment casting process have not been shown, for clarity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for preventing a foreign material from lodging in a channel between and/or damage to adjacent ceramic core features during a core processing operation, the system comprising:
a gasket sized and shaped to self-lock within the channel between adjacent ceramic core features in a ceramic core and prevent foreign material from lodging within the channel during the core processing operation, wherein the gasket includes: a cover configured to cover a portion of a ceramic core feature adjacent the channel; and a channel fill portion extending from the cover to self-lock in at least a portion of the channel.

2. The system of claim 1, wherein the gasket includes an open center body configured to surround at least a portion of at least one ceramic core feature in an exterior surface of the ceramic core.

3. The system of claim 2, wherein the gasket further includes:
a first elongate member extending from the open center body; and
a second elongate member extending from the open center body.

4. The system of claim 3, wherein the open center body, the first elongate member and the second elongate member fit within the channel in the exterior surface of the ceramic core, wherein:
the open center body is elliptical and self-locks in an elliptical channel portion of the channel about the elliptical boss,
the first elongate member extends from a first vertex of the open center, elliptical body and self-locks in a first elongate channel portion of the channel, and
the second elongate member extends from a second vertex of the open center, elliptical body and self-locks in a second elongate channel portion of the channel.

5. The system of claim 1, wherein the ceramic core feature includes one of a boss and a cooling circuit geometry within the channel.

6. The system of claim 1, wherein the gasket has an at least one of an elliptical, linear and curvilinear in shape.

7. The system of claim 1, further comprising an opening in the cover to allow access to a portion of the ceramic core feature exposed by the opening.

8. The system of claim 7, further comprising a dam element about at least a portion of the opening to prevent material exiting the opening from entering the channel.

9. The system of claim 1, wherein the gasket includes a length of material having at least one protrusion extending therefrom, the at least one protrusion self-locking in the channel.

10. The system of claim 1, wherein the gasket includes a flexible material.

11. The system of claim 1, wherein the gasket includes multiple materials having different rigidities.

12. The system of claim 1, wherein the gasket has a polygonal cross-section.

13. The system of claim 1, wherein the gasket includes an open center body configured to surround at least a portion of at least one ceramic core feature in an exterior surface of the ceramic core, wherein the gasket further includes:
a first elongate member extending from the open center body; and a second elongate member extending from the open center body, and the open center body is polygonal.

14. The system of claim 1, wherein the gasket is elliptical.

15. The system of claim 14, wherein the gasket further includes:
a first elongate member extending from the open center body; and
a second elongate member extending from the gasket,
wherein the first elongate member and the second elongate member fit within the channel in the exterior surface of the ceramic core;
the gasket self-locks in an elliptical channel portion of the channel,
the first elongate member extends from a first vertex of the gasket, elliptical body and self-locks in a first elongate channel portion of the channel, and
the second elongate member extends from a second vertex of the gasket, elliptical body and self-locks in a second elongate channel portion of the channel.

16. A system for preventing a foreign material from lodging in a channel between and/or damage to adjacent ceramic core features during a core processing operation, the system comprising:
a gasket sized and shaped to self-lock within the channel between adjacent ceramic core features in a ceramic core and prevent foreign material from lodging within the channel during the core processing operation, wherein the gasket includes a cover configured to cover a portion of a ceramic core feature adjacent the channel, further comprising an opening in the cover to allow access to a portion of the ceramic core feature exposed by the opening; and further comprising a dam element about at least a portion of the opening to prevent material exiting the opening from entering the channel.

17. The system of claim 16, wherein the gasket includes a channel fill portion extending from the cover to self-lock in at least a portion of the channel.

18. The system of claim 16, wherein the gasket includes a length of material having at least one protrusion extending therefrom, the at least one protrusion self-locking in the channel.

* * * * *